United States Patent [19]

Benton

[11] Patent Number: 4,498,729

[45] Date of Patent: Feb. 12, 1985

[54] METHOD AND APPARATUS FOR MAKING ACHROMATIC HOLOGRAMS

[75] Inventor: Stephen A. Benton, Somerville, Mass.

[73] Assignee: Polaroid Corporation, Cambridge, Mass.

[21] Appl. No.: 66,303

[22] Filed: Aug. 13, 1979

[51] Int. Cl.³ .............................................. G03H 1/20
[52] U.S. Cl. .................................. 350/3.69; 350/3.67; 350/3.85
[58] Field of Search .................... 350/3.69, 3.83, 3.85, 350/3.86, 3.67, 162 R, 3.73, 3.79, 3.7

[56] References Cited

U.S. PATENT DOCUMENTS 3,633,989 1/1972 Benton ................................ 350/3.5
3,698,787 10/1972 Mueller et al. ..................... 350/3.79

OTHER PUBLICATIONS

Benton, S. A., "White-Light Transmission/Reflection Holographic Imaging", Proceedings of Int. Conference on Applications of Holography and Optical Data Processing, held Aug. 23-26-1976, reprint of Perganon Press, pp. 401-408.
"Holographic Image of Aphrodite Intriques Polaroid Shareholders", article appearing in *Polaroid Newsletter*, May 16, 1977.
Record of exhibition at Polaroid Annual Shareholders Meeting on Apr. 26, 1977.
Holosphere, Jun. 1979 issue, p. 5.

*Primary Examiner*—Bruce Y. Arnold
*Attorney, Agent, or Firm*—Edward S. Roman

[57] ABSTRACT

A method of producing achromatic holographic images of an object, and a diffraction grating useful for making an achromatic hologram. The method comprises the steps of making a monochromatic hologram on a first photographic plate, making a diffraction grating by exposing a second photographic plate to a series of colinear point sources of mutually coherent monochromatic light, developing and bleaching the exposed plate to produce the diffraction grating, making a second hologram by exposing a third photographic plate to an image from a narrow elongated strip of the first hologram with the diffraction grating in the optical path, and making an achromatic hologram by holographically recording the image produced by illuminating the second hologram with monochromatic light on a fourth photographic plate.

7 Claims, 10 Drawing Figures

METHOD AND APPARATUS FOR MAKING ACHROMATIC HOLOGRAMS

This invention relates to holography, and particularly to novel methods and apparatus for making achromatic holographic images.

It is known to make white-light transmission or reflection holograms by exposing a photographic plate to an image made by illuminating a narrow horizontal strip of a monochromatic hologram with monochromatic light. Upon processing the plate so exposed, and illumination by an appropriately placed point source of white light, images of the subject of the original hologram are produced that may be viewed from the images of the horizontal strip, or projection slit, which are formed. As the eye is placed in any particular region of the slit image zone, which is essentially a trapezoidal region steeply inclined to the optical axis and constitutes a continum of spectrally dispersed real images, one sees the image of the original object in a color dependent upon the location of the eye in the slit image zone.

Various techniques have been proposed for making achromatic images by white-light transmission holography. If a white-light transmission hologram is illuminated by a series of point sources of white light arranged in an appropriately selected line, an achromatic image can be produced. Alternatively, a continuous source of white light along that line can be used. Another method of making achromatic holographic images is by the use of a plurality of point sources of monochromatic light appropriately arranged as reference beams in the recording of the original monochromatic hologram.

A disadvantage of the methods using a plurality of sources of white light illumination, or a continuous line source, is the spaced required for the apparatus used to display the final image. Also, very careful alignment is required to get the overlapping chromatic images in correct registration. A considerable difficulty with the method using multiple reference beams is that the process of obtaining proper balance in each of the holographic exposures that are involved as quite tedious. Another problem is spurious diffraction effects caused by interference between the reference beams.

The object of this invention is to facilitate the production and display of achromatic holographic images.

Briefly, the above and other objects of the invention are attained by a process which begins with the preparation of a conventional monochromatic hologram of the desired object. A diffractor plate, comprising a diffraction grating made by exposing a photographic emulsion to a colinear series of sources of monochromatic and mutually coherent light, is used in combination with a narrow strip of the first hologram to make a second hologram. This second hologram is then used to produce a third hologram, again with monochromatic light. Upon illumination of the third hologram with white light, an achromatic image of the original object can be seen by an observer located anywhere within a considerable volume of space.

The method and apparatus of the invention will best be understood in the light of the following detailed description, together with the accompanying drawings.

Figure 1:
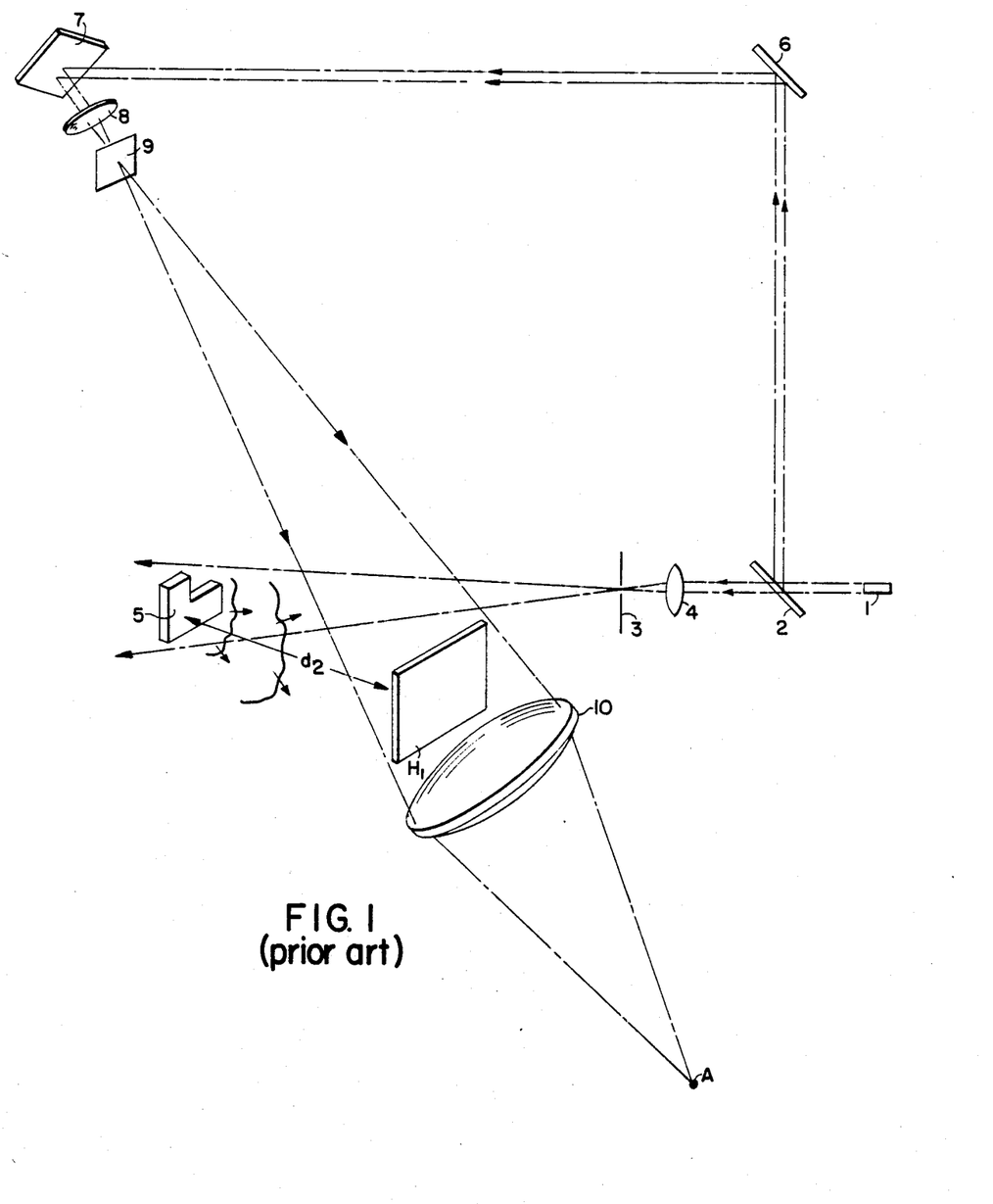
FIG. 1 is a diagrammatic perspective sketch illustrating the process of preparing a first hologram and illustrating the location of the source used to produce an image from the first hologram after it has been exposed and processed.

FIG. 1 illustrates the preparation of a conventional hologram H1 from a photographic plate on which there is a thin photographic emulsion. The emulsion is preferably capable of high resolution, for example, of 1000 lines per millimeter. The hologram is made in a conventional manner with the aid of a source of coherent monochromatic light, from a laser 1. In accordance with the invention, the wavelength of the laser 1 is selected to be as near as convenient to the center of the visible frequency spectrum. The exact frequency is not critical, and good results have been obtained with the aid of a laser operating at 514 nm, somewhat towards the blue in the green spectrum.

A collimated beam from the laser 1 is directed onto a beam splitter 2, the transmitted beam from which is focused onto a pinhole in a mask 3 by a lens 4, to form an essentially point source of light for direct illumination of an object 5, selected as the subject for the hologram, and located at a distance $d_2$ from the hologram plate. Light scattered and reflected from the object 5 falls onto the photographic emulsion on the hologram plate H1.

A reference beam is reflected from the beam splitter 2 to a mirror 6, and thence to a mirror 7 that serves to direct the beam towards the hologram H1, for example, at an angle of inclination to the vertical of 45°. The beam reflected from the mirror 7 is focused by a lens 8 onto a pinhole in a mask 9 to form a reference beam for illuminating the hologram H1 with light coherent with that scattered and reflected from the object 5.

The reference beam from the pinhole in the mask 9 may be diverging, as shown, or it may be made to converge, or to be collimated, by a suitable lens placed between the mask 9 and the hologram plate H1. A collimated reference beam is presently preferred.

After exposure, the hologram H1 is developed and fixed in the usual manner, and preferably then bleached to form a final image that is modulated imagewise in index of refraction, in terms of the imagewise concentration gradient of silver halide resulting from the bleaching process.

When prepared as just described and placed as shown in FIG. 1, the hologram H1 may be illuminated by light of the frequency of laser 1 from a source conjugate to the original reference beam, here shown as a point source at A and focused by a converging lens 10 into a beam converging to the pinhole in the location of the mask 9, which would no longer be in position. When thus illuminated with a phase-conjugate beam, an image of the original object 5 would be formed in the position of the object. Such an image would be pseudoscopic when formed by a beam conjugate to the original reference beam, but well suited as an object for further holographic recording.

As will be apparent to those skilled in the art, if a collimated reference beam is used to make the original hologram, a collimated object beam would be used to illuminate it after processing to reproduce an image of the object 5.

Figure 2:
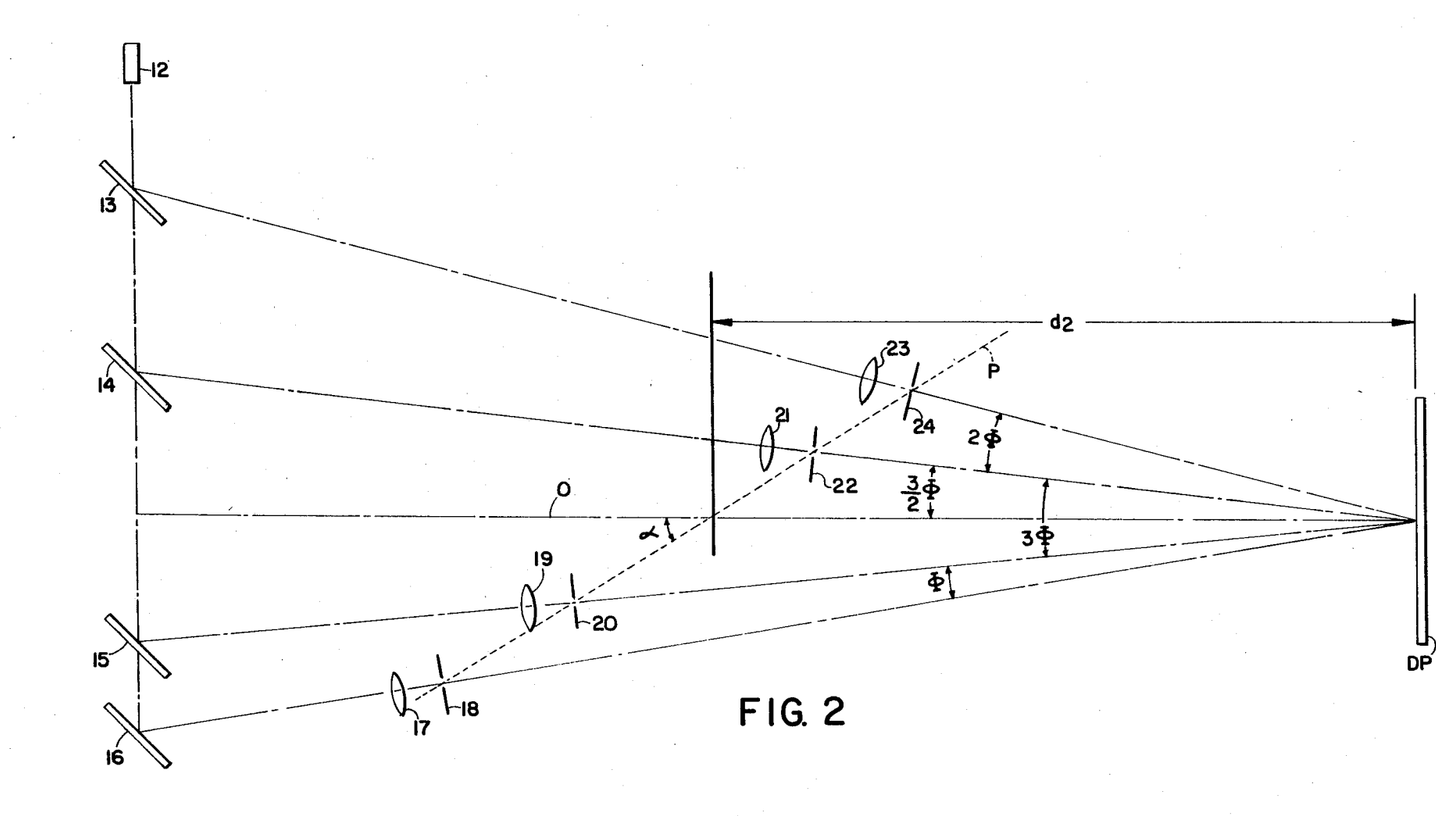
FIG. 2 is a diagrammatic elevational sketch illustrating the process of making a diffractor plate in accordance with the invention.

Referring to FIG. 2, the preparation of a multiply imaging diffractor plate in accordance with the invention is illustrated. The diffractor plate DP is formed on a photographic plate having a thin photosensitive emulsion of the type described in connection with the preparation of the hologram H1.

An optical axis O of the diffractor plate DP may be defined as the normal to the emulsion at the center of the plate. The plate DP is arranged to be illuminated by a plurality, such as four, point sources of monochromatic and mutually coherent light from a laser 12. The collimated beam from the laser 12 in part passes successively through a series of beam splitters 13, 14, and 15, and thence to a mirror 16 from which it is directed to a first lens 17 that focuses the light onto a pin-hole in a mask 18 to form a first point source making an angle 50/2 with the optical axis.

Light reflected from the beam splitter 15 is directed to a lens 19 which focuses the light into a pinhole in a mask 20 to form a point source illuminating the diffractor plate DP at an angle 30/2 to the optical axis O. Light reflected from the beam splitter 14 is directed to a lens 21 which focuses the light on a pinhole in a mask 22 that illuminates the refractor plate from an angle of 30/2 above the optical axis O. Similarly, light reflected from the beam splitter 13 is directed to a lens 23 which focuses onto a pinhole in a mask 24 that illuminates the diffractor plate at an angle of 70/2 above the optical axis O. The angles between the pinholes in the masks 18 and 20, between the pinholes in the masks 20 and 22, and between the pinholes in the masks 22 and 24 are 0, 30 and 20, respectively, as shown in FIG. 2. These angles are selected as a minimum redundancy set from which the set of angles 0, 20, 30, 40 50 and 60 is obtainable. The angle 0 is selected to be large enough for adequate spectral dispersion of images in a manner to be described, and, for example, may be in the vicinity of 2 degrees. As shown, the sources formed by the pinholes in the masks 18, 20, 22 and 24 are arranged in a line that is in a plane P at an angle alpha to the optical axis O. The intersection of the optical axis with the plane P occurs at a distance d2 from the emulsion on the plate DP.

Exposure of the diffractor plate DP as just described, followed by developing, fixing, and bleaching as described above, will be found to produce a series of 13 colinear images. Care should be taken during the exposure to make the side order images equal in intensity to the zero order image.

Figures 3, 4:
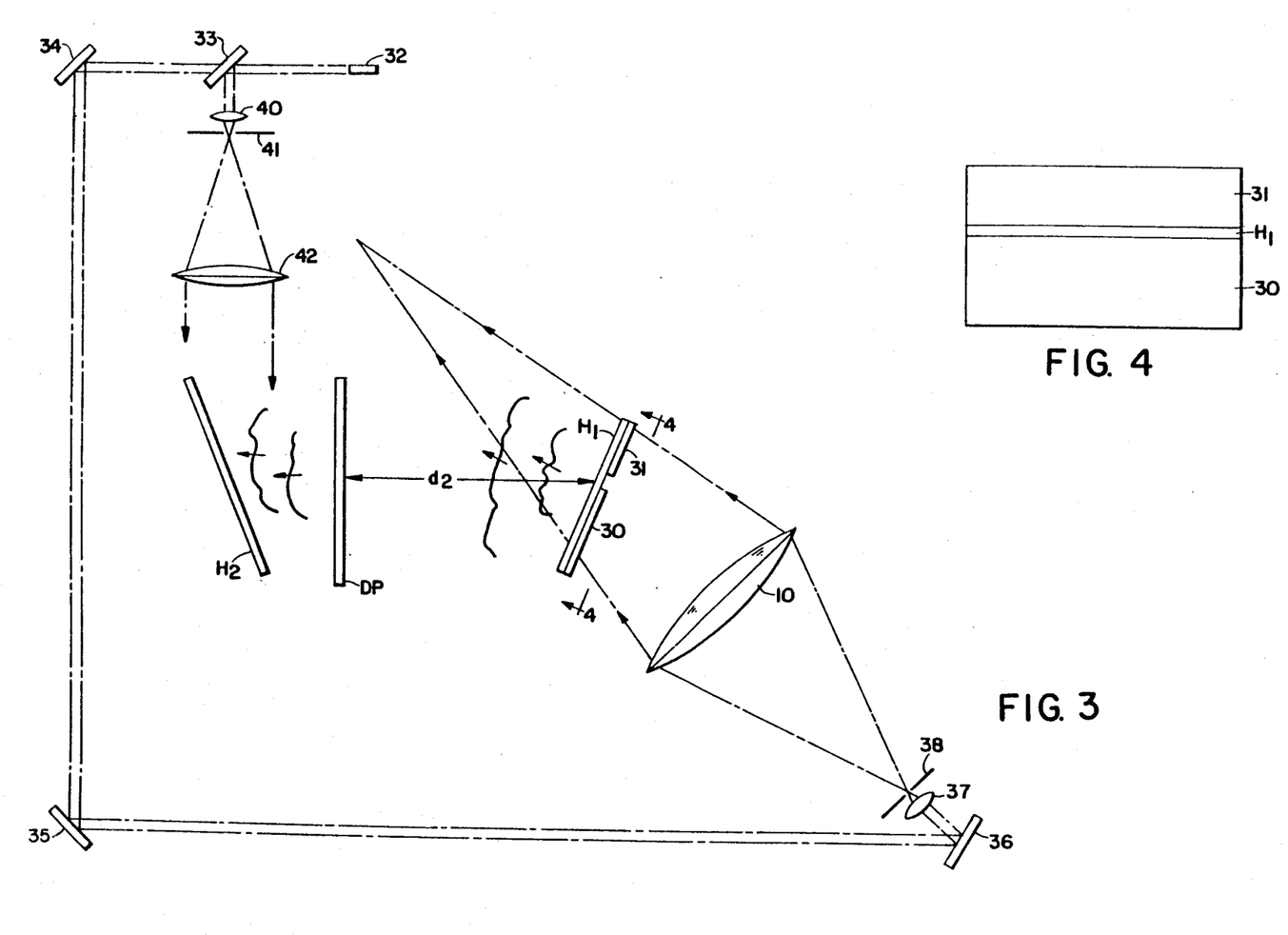
FIG. 3 is a diagrammatic sketch illustrating the process of manufacturing a second hologram in accordance with the invention.
FIG. 4 is an elevational sketch of a hologram and masks used in the process of FIG. 3, as seen essentially along the lines 4—4 in FIG. 3.

FIG. 3 illustrates the preparation of a second hologram H2 from a narrow strip of the first hologram H1 and the diffractor plate DP, both prepared as described above. The narrow strip of the hologram H1, which forms the projection slit in the process to be described, is selected by applying masks 30 and 31 to the surface of the hologram H1 as shown in FIGS. 3 and 4, to expose only the desired projection slit portion of the hologram H1. If the projection slit is chosen to be horizontal, the image reconstituted from the hologram will exhibit horizontal parallax, but not vertical parallax. Similarly, if the projection slit is selected to be vertical, vertical parallax but not horizontal parallax would be observed. The orientation of the slit at any other angle would similarly give parallax in the plane of the slit but not in directions normal to the plane of the slit. For the usual purposes of display in which observers walk around the displayed image, the conservation of horizontal parallax is preferred.

The width of the projection slit is selected as a compromise between blur or speckle, which is produced as the strip is made wider, and depth of field, which increases as the strip is made narrower. In practice, a strip between 1 and 6 millimeters is preferred.

The projection slit formed by the masks 30 and 31 of the hologram H1 is arranged to be illuminated by light conjugate to the original beam used to make the hologram H1 as described in connection with FIG. 1. As shown, the lens 10 is arranged below the hologram H1, at the angle used to make the original hologram, and focuses a converging object beam onto the projection slit in the hologram H1. For this purpose, a laser 32 transmits a portion of its collimated monochromatic beam through a beam splitter 33, thence to a mirror 34, a mirror 35, and a mirror 36 to a cylindrical lens 37 that focuses the beam onto an elongated slit in a mask 38, the slit being at the conjugate point A as described in connection with FIG. 1. The diffractor plate DP is placed at an angle to the plane of the hologram H1 that is equal to the angle between the plane of the hologrm H1 and the optical axis of the lens 10 at a distance $d_2$ from the hologram H1, and adjacent an inclined photographic plate that will form the hologram H2. In this position, the diffractor plate DP is straddled by the image produced by the hologram H2. A reference beam, preferably collimated as shown, for making the hologram H2 is provided by light reflected from the beam splitter 33 to a lens 40, which focuses onto a pinhole in mask 41 to serve as a point source that is collimated by a lens 42. The photographic plate on which the hologram H2 is formed may be inclined to the diffractor plate DP by an angle of say, 45°. Brewster's angle, around 55°, is also a good choice. The object is an arrangement that will avoid reflection of the reference beam from the plate H2 to the plate DP and back to the plate H2. After exposure to the object and reference beams as just described, the hologram H2 is processed in the same manner as the hologram H1 and diffractor plate DP described above.

Figure 5:
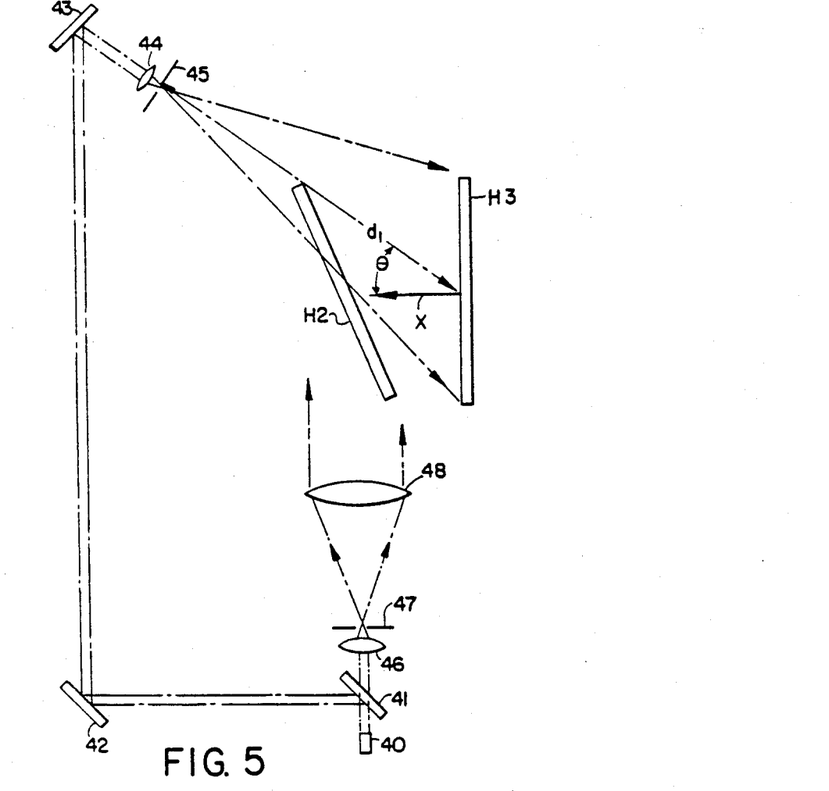
FIG. 5 is a diagrammatic plan sketch illustrating the process of preparing a third hologram in accordance with the invention.

Referring next to FIG. 5, the hologram H2 is used to make a third hologram H3. The hologram H3 is made on a photographic plate as described above, placed in the position of the diffractor plate DP in FIG. 3 relative to the hologram H2, and using a monochromatic reference beam inclined at an angle to the vertical of, for example, 45°. The reference beam is produced by a laser 40, the collimated beam of light from which is partly reflected from a beam splitter 41 to a mirror 42, thence to a mirror 43, and from the mirror 43 to a lens 44 where it is focused onto a pinhole in a mask 45. The pinhole 45 is located at a distance $d_1$ from the intersection of the optical axis X of the hologram H3 with the photographic emulsion. The source is inclined to the optical axis X of the hologram H3 by an angle theta, which, for example, may be 45°. As indicated, the reference beam may, and preferably does, pass through the hologram H2.

An object beam for making the hologram H3 is produced by light from the laser 40 transmitted through the beam splitter 41 to a lens 46 which focuses the light onto a pinhole in a mask 47. Light from the point source so formed is collimated by a lens 48 to produce a collimated beam self-conjugate to the collimated beam used to form the hologram H2. The hologram H2 thus forms an image which is recorded on the hologram H3 in interference with the reference beam. After recording in the manner just described, the hologram H3 is processed in the same manner as the other holograms described above.

Figure 6:
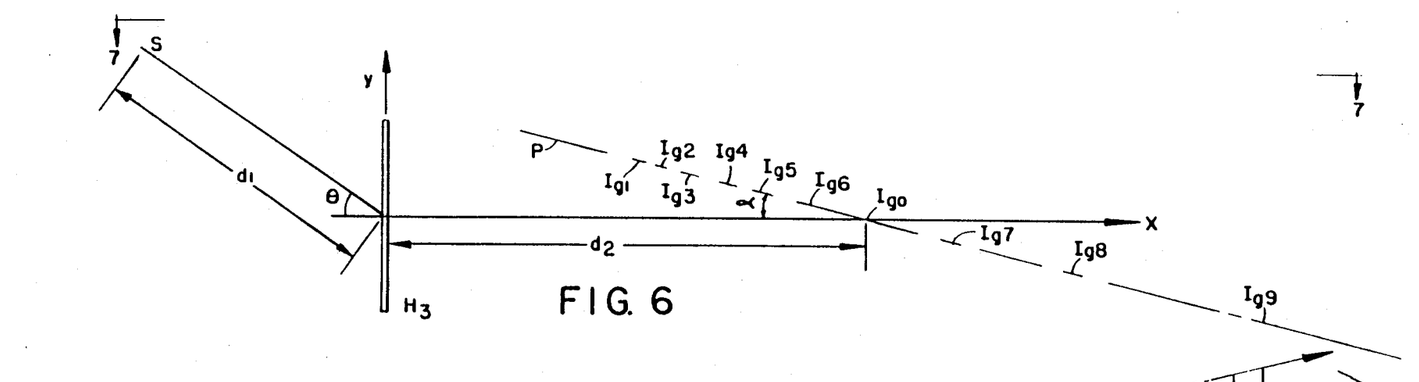
FIG. 6 is a diagrammatic elevational sketch illustrating the formation of slit images from a hologram made in accordance with the process of FIG. 5.
Figure 7:
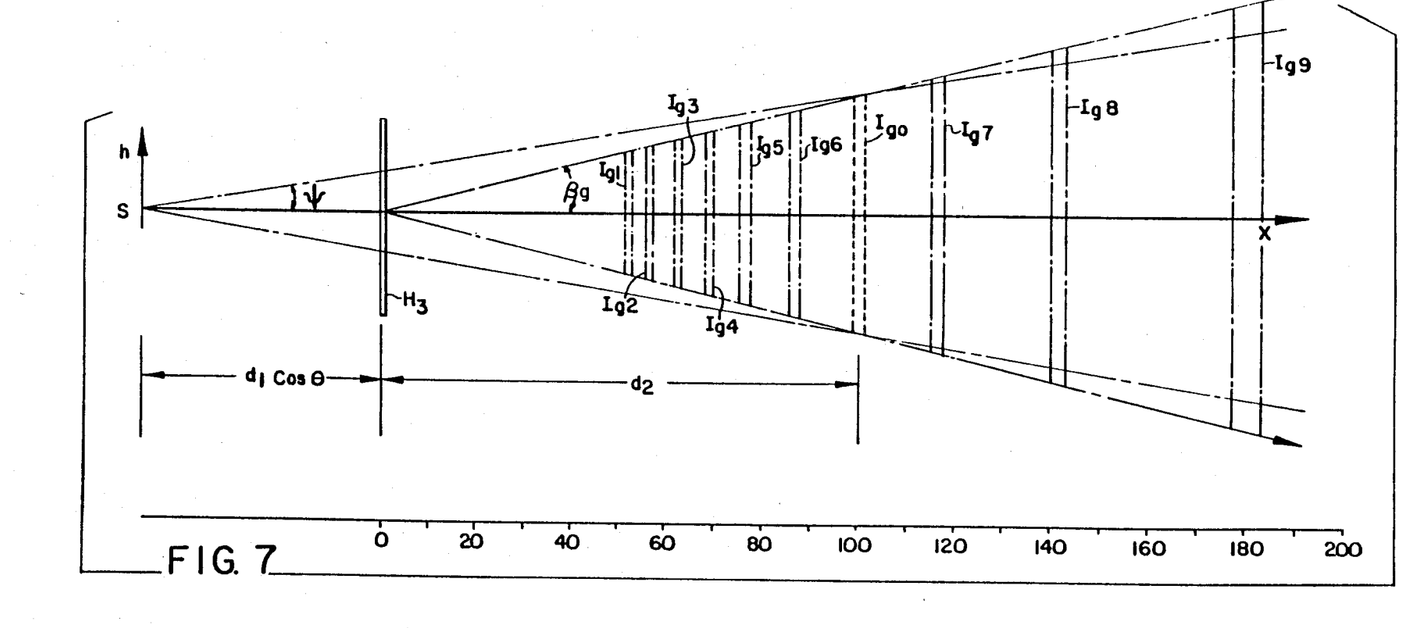
FIG. 7 is a diagrammatic plan sketch of the imaging process illustrated in FIG. 6, as seen essentially along the lines 7—7 in FIG. 6.

Before considering the formation of achromatic images with the hologram H3, its performance when illuminated with monochromatic light will next be described in connection with FIGS. 6 and 7. As suggested in FIG. 6, the hologram H3 is arranged to be illuminated by a monochromatic source S at a distance $d_1$ from the intersection of the optical axis of the hologram H3 with the hologram emulsion, and at an angle theta to the optical axis that is the same as the angle of illumination from the pinhole in the mask 45 in FIG. 5. The source S will be assumed to be in the green light region, the same as the wavelength of the light used to produce the original hologram H1. When illuminated with light from the source S, the hologram H3 will produce a zero order image $I_{g0}$ centered on the optical axis and inclined to the optical axis by the angle alpha, which is the same angle alpha as that at which the sources were inclined in FIG. 2 to make the diffractor plate, and is the reason for the choice of that angle. This zero order image $I_{g0}$ would be produced without the use of the diffractor plate. With the diffractor plate, six images in the plane P at the angle alpha are formed above the optical axis, and six images are formed in the same plane below the optical axis. These slit images, identified as $I_{g1}$ through $I_{g12}$, subtend successively the angles 0, 20, 30, 40, 50 and 60 above the optical axis, and $-0$, $-20$, $-30$, $-40$, $-50$, and $-60$ below the optical axis. As seen in FIGS. 6 and 7, the location of the image $I_{g0}$ is at the distance of $d_2$ from the hologram H3 which corresponds to the distance $d_2$ in FIG. 2 from the intersection of the plane P with the optical axis O of the diffractor plate and the emulsion on the diffractor plate.

Referring to FIG. 7, at this distance $d_2$ the green image $I_{g0}$ subtends an angle $2\Psi$ from the subject illumination source S as projected into the horizontal h,X plane in FIG. 7. The diffractor plate acts to preserve the angle $\beta g$ subtended by the image $I_{g0}$ from the plane of the hologram H3, and thus each of the additional images above and below the axis subtend the same angle $\beta g$ from the optical axis. The result is that the auxiliary slit images are demagnified on the hologram side of the image $I_{g0}$ and magnified on the side away from the hologram.

An eye placed in the location of any of the slit images $I_{g0}$ through $I_{g12}$ will see an image of the original object from the same perspective. As the eye is moved up or down in the plane of FIG. 7 (i.e., horizontally to the right or left) in one of these images, horizontal parallax will be observed. In the case illustrated in FIGS. 6 and 7, all of the images will be green.

Figure 8:
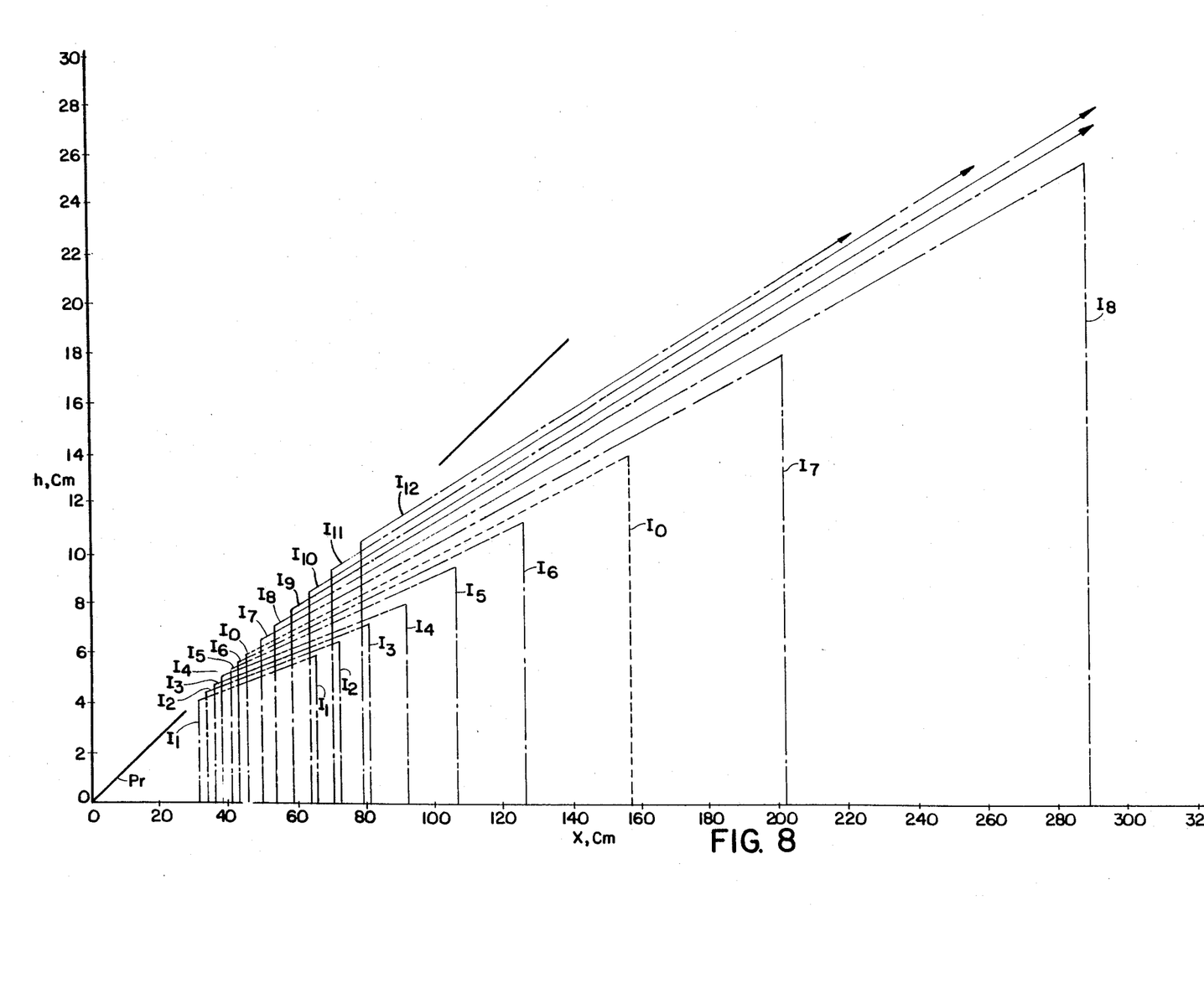
FIG. 8 is a diagrammatic graphical sketch in the plane of FIG. 7 illustrating a plurality of chromatic images produced by illuminating the hologram made in accordance with the process illustrated in FIG. 5 with white light.

FIG. 8 is a view somewhat similar to FIG. 7 illustrating the formation of slit images when a white light source is placed at point S in FIGS. 6 and 7. The images formed are now spectrally dispersed over a region from red to blue determined by the spectrum emitted by the source S, and these chromatic images, identified in FIG. 8 by the reference characters $I_0$ through $I_{12}$, are coplanar, overlapping, and each demagnified toward the red end and magnified towards the blue end of the spectrum. In FIG. 8, distances along the horizontal h axis are shown magnified approximately 10 times relative to distances along the X axis.

It will be seen that all of the images $I_1$ through $I_{12}$ overlap the 0 order image $I_0$. As shown with considerable exaggeration in FIG. 8, the widths of the images are not equal at any given position along the X axis, so that as the eye moves along the h axis, color fringing will begin to be seen at some value of h near the edges of the images. In the center of the image zone, at $h=o$, all images will be perfectly in registration and the view will be achromatic over a relatively large zone. Due to the geometry of the imaging process, the blue ends of the images fall progressively farther out on the X axis, until in the illustrated example shown images $I_{11}$ and $I_{12}$ would depart from the image plane P without intersection with the plane.

The diagrams of FIG. 8 were made by application of paraxial theory, and are accordingly approximate. Actually, the plane P is a surface that is curved downwardly as seen in FIG. 6, and the plane shown is for horizontal focus only, the vertical focus plane being at an angle to the horizontal focus plane as the result of astigmatism.

Figure 9:
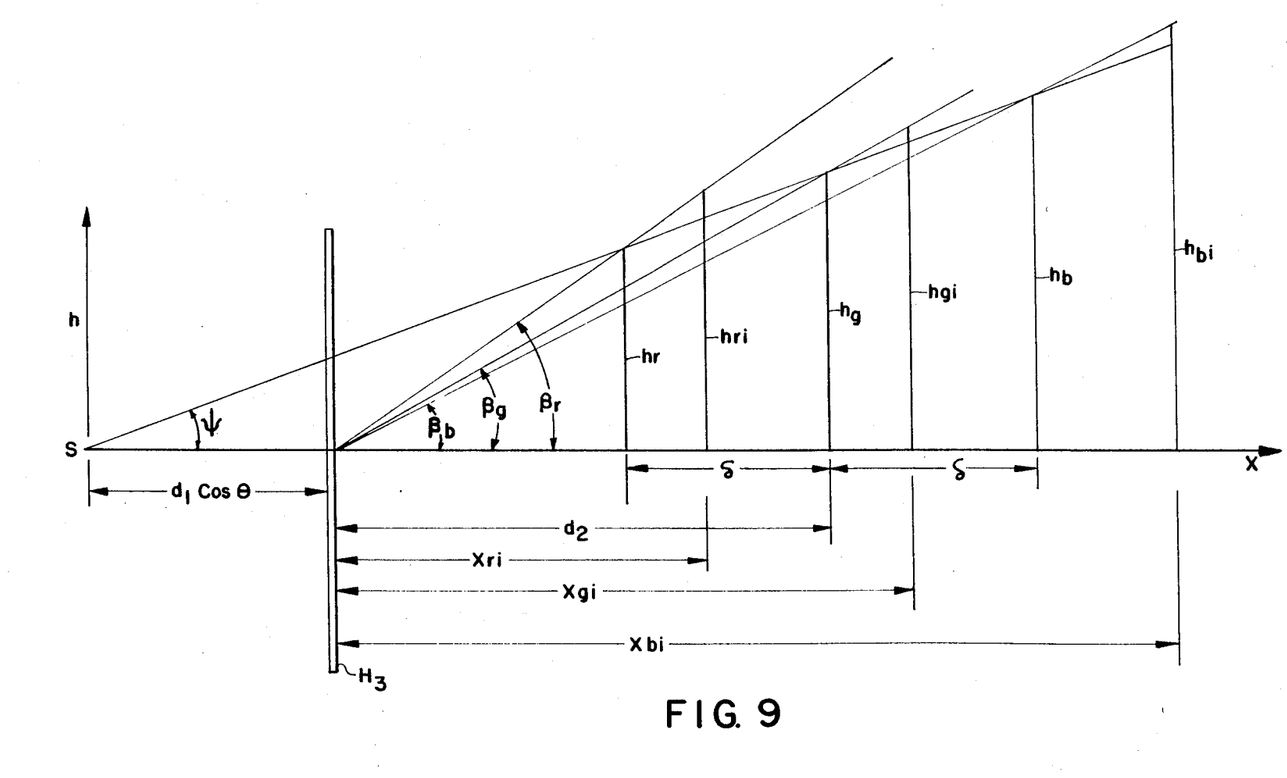
FIG. 9 is a diagrammatic graphical and elevational sketch, in the plane of FIG. 6, illustrating the geometrical relationships between elements of the images illustrated in FIG. 8.

FIG. 9 illustrates certain geometrical relationships between the elements of the images formed as diagrammed in FIG. 8. Only half of the image regions are shown in FIGS. 8 and 9, the other half being symmetrical and lying below the X axis. Referring to FIG. 9, the principal image $I_0$ has a half-width of hb at its blue end, a half-width hg at the distance $d_2$ from the hologram H3 corresponding to the center of the green image, and a half-width hr at the red end of the spectrum. The image elements hr, hg and hb of the image $I_0$ also subtend the same angle psi from the source S.

The image elements of half-widths hr and hb at the red and blue ends of the spectrum in the image zone $I_0$ are shown spaced from the central element of half-width hg by the same distance $\delta$. The distance $\delta$ is given approximately by $$\delta = \frac{\Delta\lambda d_2}{\lambda g}\left(1 + \frac{d_2}{d_1}\right) \quad (1)$$

when $d_1$ and $d_2$ are as given above, $\lambda g$ is the wavelength at hg, corresponding to the wavelength emitted by the laser used to make H3, and $\Delta\lambda$ is the difference in wavelength between $\lambda q$ and the wavelengths $\lambda r$ or $\lambda q$ at hr or hg, respectively. If the wavelength $\lambda q$ is not centered in the spectrum, different values of $\delta$ will be obtained.

As noted above, good results have been obtained with $\lambda g$ toward the blue, so that this point is not particularly critical. The difference is basically a warmer or a cooler white in the reconstructed image over the achromatic region of the space in which the image can be viewed. Thus, the choice of $\lambda g$ may be based in part on aesthetic considerations, although the availability of lasers at particular operating wavelengths may be the practical determining factor. For simplicity of discussion, it will be assumed that hg is centered in the spectrum as shown in FIG. 9.

As mentioned above, the effect of the diffractor plate is to preserve the angle subtended by an element of the zero order image from H3 in the various supplementary images. Thus, an element hri in one of the images $I_1$–$I_{12}$ corresponding to hr would subtend the same angle $\beta r$ from H3. Similarly, image elements hgi and hbi, corresponding to hg and hb, respectively, would subtend the angles $\beta g$ and $\beta r$, respectively.

The half widths hr and hb in the zero order image Io are given by $$hr = \left(1 - \frac{\delta}{d_1 \cos\theta + d_2}\right) hg \quad (2)$$

and $$hb = \left(1 + \frac{\delta}{d_1 \cos\theta + d_2}\right) hg \quad (3)$$

The corresponding values hri, hgi and hbi are given by $$hri = \frac{hrXri}{d_2 - \delta} \quad (4)$$

$$hgi = \frac{hgXgi}{d_2} \quad (5)$$

and $$hri = \frac{hbXbi}{d_2 + \delta}, \quad (6)$$

where Xri, Xgi and Xbi are the projections of the corresponding image elements on the X axis.

Figure 10:
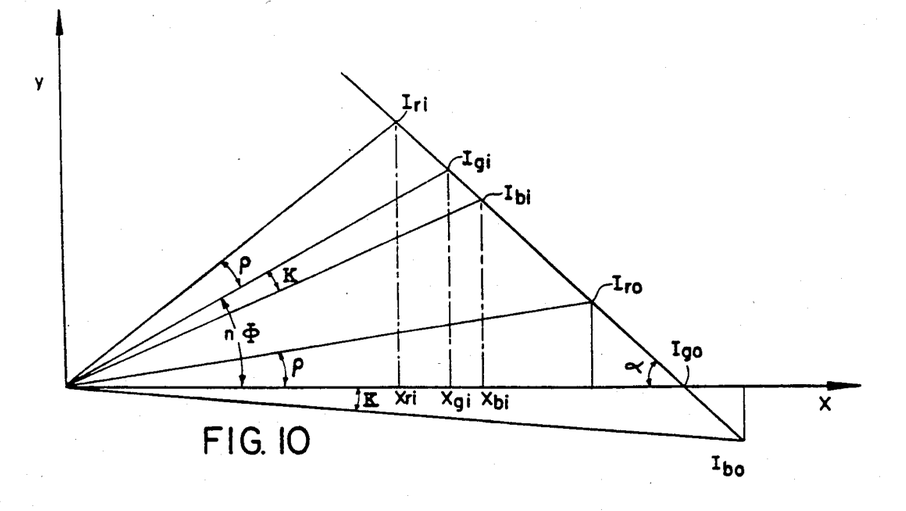
FIG. 10 is a diagram illustrating the geometrical relationship between elements of slit images formed in accordance with the invention.

FIG. 10 illustrates the location of any of the auxiliary images $I_i$ by rotation of elements of the Image Io through an angle n0, where 0 is as defined above and n has the successive values 6,5, ... 1,−1, ... −5,−6 for the successive images $I_1$, $I_2$ ... $I_{12}$, respectively. The angle $\alpha$ of the image plane, greatly exaggerated in FIG. 10, is given approximately by $$\alpha \simeq \tan^{-1}\left(\frac{\sin\theta}{1 + \frac{d_2}{d_1}}\right) \quad (7)$$

The projections Xri, Xgi and Xbi in the auxiliary images are given by $$Xri = \frac{d_2 \sin\alpha \cos(n\phi + p)}{\sin(n\phi + p + \alpha)} \quad (8)$$

$$Xgi = \frac{d_2 \sin\alpha \cos n\phi}{\sin(n\phi + \alpha)} \quad (9)$$

and $$Xbi = \frac{d_2 \sin\alpha \cos(n\phi - k)}{\sin(n\phi + \alpha - k)} \quad (10)$$

where $$k = \tan^{-1}\left(\frac{\delta \tan\alpha}{d_2 + \delta}\right) \quad (11)$$

and $$p = \tan^{-1}\left(\frac{\delta \tan\alpha}{d_2 - \delta}\right) \quad (12)$$

In Equations (8), (9) and (10), as i successively takes on the values 1,2, ... 12, n successively takes on the values 6,5 ... 1,−1, ... −5,−6, respectively, to locate the corresponding elements of the successive images $I_1$ ... $I_{12}$, respectively.

The numerical values given in FIG. 10 were found from the above equations on the basis of a specific embodiment characterized by the following parameters:
$\theta = 45°$
hg = 10 cm
$d_1 = 50$ cm
$d_2 = 100$ cm
$\phi = 2°$
$\lambda r = 650$ nm
$\lambda g = 550$ nm
$\lambda b = 450$ nm If desired, the hologram H2 could be made as in FIG. 3 except with the diffractor plate DP in contact with H2, using a converging reference beam. Illumination of the hologram made by this process with white light would given an achromatic image of good quality. However, the diffractor plate would also diffract the reference beam through large angles, giving flare to the image that would be objectionable for some purposes.

While the invention has been described with reference to the specific details of particular embodiments, many changes and variations will be apparent to those skilled in the art upon reading this description, and such can obviously be made without departing from the scope of the invention.

Having thus described the invention, what is claimed is:

1. The process of making a hologram for the display of achromatic images comprising the steps of: arranging a multiply imaging diffractor plate between a first hologram of an object formed on a first photographic plate and a second photographic plate; illuminating a narrow elongated strip of said first hologram with monochromatic light in a first object beam conjugate to the reference beam with which the said first halogram was made while illuminating said second photographic plate with a first reference beam of light coherent with said first object beam; processing said second photographic plate to make a second hologram; arranging a third photographic plate adjacent said second hologram in position to record an image formed by said second hologram; illuminating said second hologram with a second object beam of monochromatic light conjugate to said first reference beam while illuminating said third photographic plate with a second reference beam coherent with said second object beam; and processing said third photographic plate to make a third hologram.

2. A multiply imaging diffraction grating comprising a plane translucent image recorded on a photographic medium of the interference pattern which is formed by light from at least three point sources of mutually coherent monochromatic light, said sources arranged in a line at the intersection of a first plane normal to the plane of said photographic medium and passing through the center of the photographic medium and a second plane intersecting said first plane at an acute angle to a normal to said plane of said photographic medium.

3. The process of forming a multiply imaging diffractor plate, comprising the steps of placing a photographic plate with its recording surface in a first plane; locating at least three point sources of monochromatic and mutually coherent light along a line in a second plane normal to said first plane, said line intersecting said photographic plate at an acute angle of incidence; exposing said plate to light from said sources; and processing said exposed plate to produce a translucent diffraction grating.

4. The process of making a hologram for the display of achromatic images comprising the steps of: making a first hologram of a subject with first monochromatic object and reference beams of mutually coherent light at a wavelength $\lambda g$ in the green region of the visible spectrum; making a diffractor plate by exposing a first photographic plate arranged in a first plane to a series of point sources of monochromatic, mutually coherent light at the wavelength $\lambda g$, said point sources being arranged in a line intersecting said first plane and intersecting a normal to said first plane passing through said first plate at an angle $\alpha$ and at the distance $d_2$ at which said first hologram would produce an image of said narrow strip of said first hologram when illuminated by a monochromatic beam of light of wavelength $\lambda g$ conjugate to the reference beam used to produce the first hologram; processing said exposed first plate to make a translucent multiply imaging diffractor plate; placing said diffractor plate at the distance $d_2$ from said first hologram; illuminating a narrow strip of said first hologram with a monochromatic second object beam of wavelength $\lambda g$ and conjugate to said first reference beam; exposing a second photographic plate to light from said second object beam passing through said first hologram and said diffractor plate and to a second reference beam coherent with said second object beam; processing said exposed second plate to make a second hologram; placing said second hologram and a third photographic plate in the relative positions of said second plate and said diffractor plate in which said second hologram was made; illuminating said third plate with a third reference beam of monochromatic light from a point source at the wavelength $\lambda g$, said point source forming said third reference beam being located at an angle $\theta$ to the optical axis of said third plate and at a distance $d_1$ from the intersection of the optical axis of said third plate with said third plate, while illuminating said second hologram with a third object beam of monochromatic light at the wavelength $\lambda g$, conjugate to said second reference beam, and coherent with said third reference beam, to expose said third plate to light passing through said second hologram from said third object beam; and processing said third plate to produce a third hologram capable of producing an achromatic image of said subject when illuminated by a point source of white light, said angle $\alpha$ being given by $$\alpha = \tan^{-1}\left(\frac{\sin\theta}{1 + \frac{d_2}{d_1}}\right).$$

5. The process of making a hologram for the display of achromatic images comprising the steps of: making a first hologram of a subject with first object and reference beams of monochromatic light at a wavelength between the red and the blue in the visible spectrum; making a diffraction grating by photographically recording an image of the interference pattern in a first plane between a plurality of point sources of monochromatic mutually coherent light arranged in a line lying in a second plane normal to said first plane and intersecting a normal to said first plane at an acute angle; placing said diffraction grating between said first hologram and a first photographic plate with said diffraction grating located in the region of image formation by said first hologram; illuminating a narrow strip of said first hologram with a second object beam at said wavelength and conjugate to said first reference beam while illuminating said first photographic plate with a second reference beam coherent with said second object beam to holographically record multiple images from said strip diffracted by said diffraction grating on said first photographic plate; processing said first photographic plate to make a second hologram; and holographically recording images produced by illuminating said second hologram with a third object beam at said wavelength and conjugate to said second reference beam using a third reference beam coherent with said third object beam.

6. The process of claim 3, in which said point sources comprise four sources, a first and a second of which subtend an angle 0 from a point at the intersection of a normal to said first plane in said image surface and said image surface, in which said second and a third of said sources subtend an angle 30 from said point, and in which said third and the fourth of said sources subtend an angle 20 from said point.

7. The process of making a hologram for the display of achromatic images comprising the steps of: placing a first photographic plate with its recording surface in a first plane; locating a plurality of point sources of monochromatic and mutually coherent light along a line in a second plane normal to said first plane; exposing said first plate to light from said sources; processing said exposed first plate to make a multipy imaging diffractor plate; arranging said multiply imaging diffractor plate between a first hologram of a subject formed on a second photographic plate and a third photographic plate; illuminating a narrow strip of said first hologram with monochromatic light in a first object beam conjugate to the reference beam with which said first hologram was made while illuminating said third photographic plate with a first reference beam of light coherent with said first object beam; processing said third plate to make a second hologram; arranging a fourth photographic plate adjacent said second hologram in position to record an image formed by said second hologram; illuminating said second hologram with a second object beam of monochromatic light conjugate to said first reference beam while illuminating said fourth photographic plate with a second reference beam coherent with said second object beam; and processing said fourth photographic plate to make a fourth hologram.

* * * * *